United States Patent
Linton (10) Patent No.: US 9,638,292 B1
(45) Date of Patent: May 2, 2017

(54) CVT DIFFERENTIAL

(71) Applicant: Schaeffler Technologies AG & Co. KG, Herzogenaurach (DE)

(72) Inventor: Daniel Linton, North Canton, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/923,886

(22) Filed: Oct. 27, 2015

(51) Int. Cl.
- *F16H 3/72* (2006.01)
- *F16H 48/10* (2012.01)
- *F16H 48/08* (2006.01)
- *F16H 3/00* (2006.01)

(52) U.S. Cl.
CPC ............. *F16H 3/728* (2013.01); *F16H 3/006* (2013.01); *F16H 3/725* (2013.01); *F16H 48/08* (2013.01); *F16H 48/10* (2013.01)

(58) Field of Classification Search
None
See application file for complete search history.

(56) References Cited

U.S. PATENT DOCUMENTS

| | | | |
|---|---|---|---|
| 5,343,970 A | 9/1994 | Severinsky | |
| 5,521,819 A | 5/1996 | Greenwood | |
| 6,732,526 B2* | 5/2004 | Minagawa | B60K 6/445 180/65.235 |
| 6,887,175 B2* | 5/2005 | Yamauchi | B60K 6/365 475/10 |
| 7,090,607 B2* | 8/2006 | Yamauchi | B60K 6/445 475/5 |
| 7,097,586 B2* | 8/2006 | Joe | B60K 6/445 475/5 |
| 7,259,493 B2* | 8/2007 | Oshidari | B60K 6/26 180/65.6 |
| 7,427,252 B2* | 9/2008 | Holmes | B60K 6/40 475/10 |
| 7,479,081 B2* | 1/2009 | Holmes | B60K 6/365 475/5 |
| 8,204,639 B2 | 6/2012 | Jinno et al. | |
| 8,480,532 B2 | 7/2013 | Biermann et al. | |

(Continued)

FOREIGN PATENT DOCUMENTS

WO 2010003505 1/2010

OTHER PUBLICATIONS

Schaeffler Group Automotive, 9th Schaeffler Symposium, Apr. 13-14, 2010, Driven by the Next Generations, pp. 95-105.

*Primary Examiner* — Dirk Wright
(74) *Attorney, Agent, or Firm* — Volpe and Koenig, P.C.

(57) ABSTRACT

A CVT (continuously variable transmission) differential is provided which includes a first drive input ring gear having internal teeth. A planetary or bevel gear differential is connected to the first drive input ring gear. The planetary differential includes a planet gear carrier, first planet gears, second planet gears, a first sun gear, and a second sun gear. Alternatively, the bevel gear differential includes a carrier that supports drive and driven bevel gears. A second drive input is connected to the planet gear carrier or bevel gear carrier. Preferably, a primary drive is connected to the first drive input ring gear, which can be an internal combustion engine or an electric motor. Preferably, a secondary drive is connected to the second drive input, which is preferably an electric motor, for example for a hybrid motor vehicle.

12 Claims, 6 Drawing Sheets

(56) References Cited

U.S. PATENT DOCUMENTS

| | | |
|---|---|---|
| 8,613,685 B1 | 12/2013 | Yang |
| 2006/0009884 A1 | 1/2006 | Mensler et al. |
| 2010/0240485 A1 | 9/2010 | Strasser et al. |
| 2011/0245003 A1* | 10/2011 | Takami ................. B60K 6/365 475/5 |
| 2013/0225352 A1 | 8/2013 | Clauson |

* cited by examiner

CVT DIFFERENTIAL

FIELD OF THE INVENTION

The present invention is related to the field of drive trains for motor vehicles, and in particular to continuously variable transmissions and differentials

BACKGROUND

Motor vehicles typically include a drive train with a primary drive, such as an internal combustion engine, which is paired with a transmission in order to provide different gear drive ratios from the engine to the drive wheels. Typically, the transmission is connected to a differential which transmits torque from the transmission to output axles, with the differential compensating for different rotational speeds of wheels attached to the output axles which occurs, for example, during turning. Various transmissions are known including manual transmissions which include a vehicle operator activated clutch and a shifter which the vehicle operator uses to engage different gears, automatic transmissions which include internal clutches and speed sensors for automatic shifting between gears, double clutch standard transmissions which are electronically shifted based on various operating conditions, as well as continuously variable transmissions (CVTs) which offer a continuously variable torque ratio over a wide range of drive ratios without the need for separate gearing being engaged or disengaged as is required in the manual, automatic, and double clutch transmissions.

Differentials are also known in the form of both spur gear differentials and bevel gear differentials. Spur gear differentials provide an advantage in that the axial length of the differential in a direction of the output axes is drastically reduced in comparison to a bevel gear differential. Spur gear differentials utilize spur gears connected to a planetary gear carrier that itself is driven by the transmission output and drives the output axles via sun gears that engage the planetary gears. Here a first set of planet gears is associated with the first sun and a second set of planet gears is associated with the second sun, with the first and second planet gears also intermeshing via the first set of planet gears axially overlapping and engaging the second set of planet gears. The number of teeth of the planet gears of both sets is equal and the number of teeth of the first and second sun gears is also equal. Generally, the teeth of the first sun gear are arranged on a crown circle with a crown circle diameter that is different than the crown circle diameter of the crown circle on which the teeth of the second sun are arranged so that the first set of planet gears meshes with only the first sun and the second set of planet gears meshes only with the second sun. Such a spur gear differential is known from U.S. Pat. No. 8,480,532, which is owned by the assignee of the present invention and is incorporated herein by reference as if fully set forth.

Bevel gear differentials also include a carrier in which a pair of drive bevel gears are mounted that engage with a pair of driven bevel gears having a common axis that is arranged perpendicular to the common axis of the drive bevel gears. The driven bevel gears are connected to the output axels.

There has been a drive in the automotive field to reduce the weight of motor vehicles in order to increase efficiency. Additionally, making portions of the drive train modular for easier installation and removal of the engine, transmissions and differential, has also been a consideration in order to reduce assembly costs. Additionally, further considerations come into play in connection with hybrid motor vehicles where a primary drive is provided, generally in a form of an internal combustion engine, and a secondary drive is provided, typically in the form of an electric motor driven via on board batteries in the motor vehicle.

It would be beneficial to reduce the weight of the drive train of a motor vehicle as well as consolidate components for easier manufacture and installation in order to reduce manufacturing costs. Further, it would be desirable to provide a system that can be easily integrated into hybrid vehicles. It would also be desirable to eliminate components from a motor vehicle in order to reduce motor vehicle weight without sacrificing functionality.

SUMMARY

A CVT (continuously variable transmission) differential is provided. The CVT differential includes a first drive input ring gear having internal teeth. A planetary differential is connected to the first drive input ring gear. The planetary differential includes a planet gear carrier, first planet gears, second planet gears, a first sun gear, and a second sun gear. Teeth of first planet gears are engaged by the internal teeth of the first drive input ring gear and engage with teeth of the first sun gear. The teeth of each of the first planet gears also engage teeth of corresponding ones of the second planet gears. The teeth of the second planet gears engage teeth of the second sun gear. A second drive input is connected to the planet gear carrier. Preferably, a primary drive is connected to the first drive input ring gear, which can be an internal combustion engine or an electric motor. Optionally, a torque converter is located between the primary drive and the first drive input ring gear. Preferably, a secondary drive is connected to the second drive input. The secondary drive is preferably an electric motor, for example for a hybrid motor vehicle. In this case, it would also be preferable that the second electric motor is a motor-generator in order to allow regeneration during braking. The second electric motor is connected to a controller in order to control an output ratio of the CVT differential to vary at least one of a speed or a direction of rotation of the first and second sun gears, which are preferably connected to output shafts or axles.

In a preferred embodiment, the second electric motor includes a rotor connected to the planet carrier and a stator mounted fixed relative to the rotor, preferably to a vehicle frame or chassis. Here, the second electric motor is preferably mounted concentric with the output shaft or axels.

This arrangement provides a CVT planetary differential that has an extremely wide gear ratio while maintaining a slim, lightweight differential design. By providing the internal teeth on the first drive input ring gear that interact with the planetary gears, and allowing the planetary carrier to rotate independently from the first drive input ring gear, and by controlling the secondary drive in both speed and direction, the output gar ratio range as well as reverse can be obtained without ever disengaging the primary gear drive. This provides a compact CVT differential that eliminates the use of belts, pulleys, tensioners, synchronizers, as well as a dedicated reverse gear. Further, it is possible to eliminate a clutch and/or torque converter.

In another aspect, the CVT differential is formed using a bevel gear differential. Here the CVT differential includes a first drive input ring gear having internal teeth. A carrier with planet gears is located within the first drive input ring gear. Teeth of the planet gears engage the teeth of the first drive input ring gear. A bevel gear differential that includes a bevel gear carrier having external teeth is provided. The teeth of the planet gears engage the external teeth of the bevel gear differential. A second drive input is connected to the carrier. This provides a CVT differential using the known bevel gear differential with preferably a primary drive being connected to the first drive input ring gear, with the primary drive being an internal combustion engine or an electric motor, and a secondary drive, preferably a second electric motor, being attached to the second drive input. Optionally, a torque converter is located between the primary drive and the first drive input ring gear. The second drive input preferably comprises a gear located on the carrier and further comprises the second electric motor having a second drive gear engages the gear on the carrier.

For hybrid motor vehicles, preferably the second electric motor is a motor-generator in order to allow regenerative braking. As in the CVT differential using a spur gear differential, the CVT differential using a typical bevel gear differential also provides a combined transmission and differential that eliminates the use of belts, pulleys, tensioners, synchronizers as well as dedicated reverse gears and also provides an inherently wide ratio capability.

In both cases, the CVT differential designs are ideal for situations where two power inputs are desired in combination with a smaller, lighter transmission while maintaining a true differential torque path to the output axles.

BRIEF DESCRIPTION OF THE DRAWINGS

The foregoing Summary as well as the following Detailed Description will be best understood when read in conjunction with the appended drawings which show a preferred embodiment of the invention. In the drawings.

DETAILED DESCRIPTION OF THE PREFERRED EMBODIMENTS

Certain terminology is used in the following description for convenience only and is not limiting. The words "front," "rear," "upper" and "lower" designate directions in the drawings to which reference is made. The words "inwardly" and "outwardly" refer to directions toward and away from the parts referenced in the drawings. These terms and terms of similar import are for ease of description when referring to the drawings and should not be considered limiting. "Axially" refers to a direction along the axis of a shaft or similar object. A reference to a list of items that are cited as "at least one of a, b, or c" (where a, b, and c represent the items being listed) means any single one of the items a, b, or c, or combinations thereof.

For elements of the invention that are identical or have identical actions, identical reference symbols are used. The illustrated embodiments represent merely examples for how the device according to the invention could be equipped. They do not represent a conclusive limitation of the invention.

Figure 1:
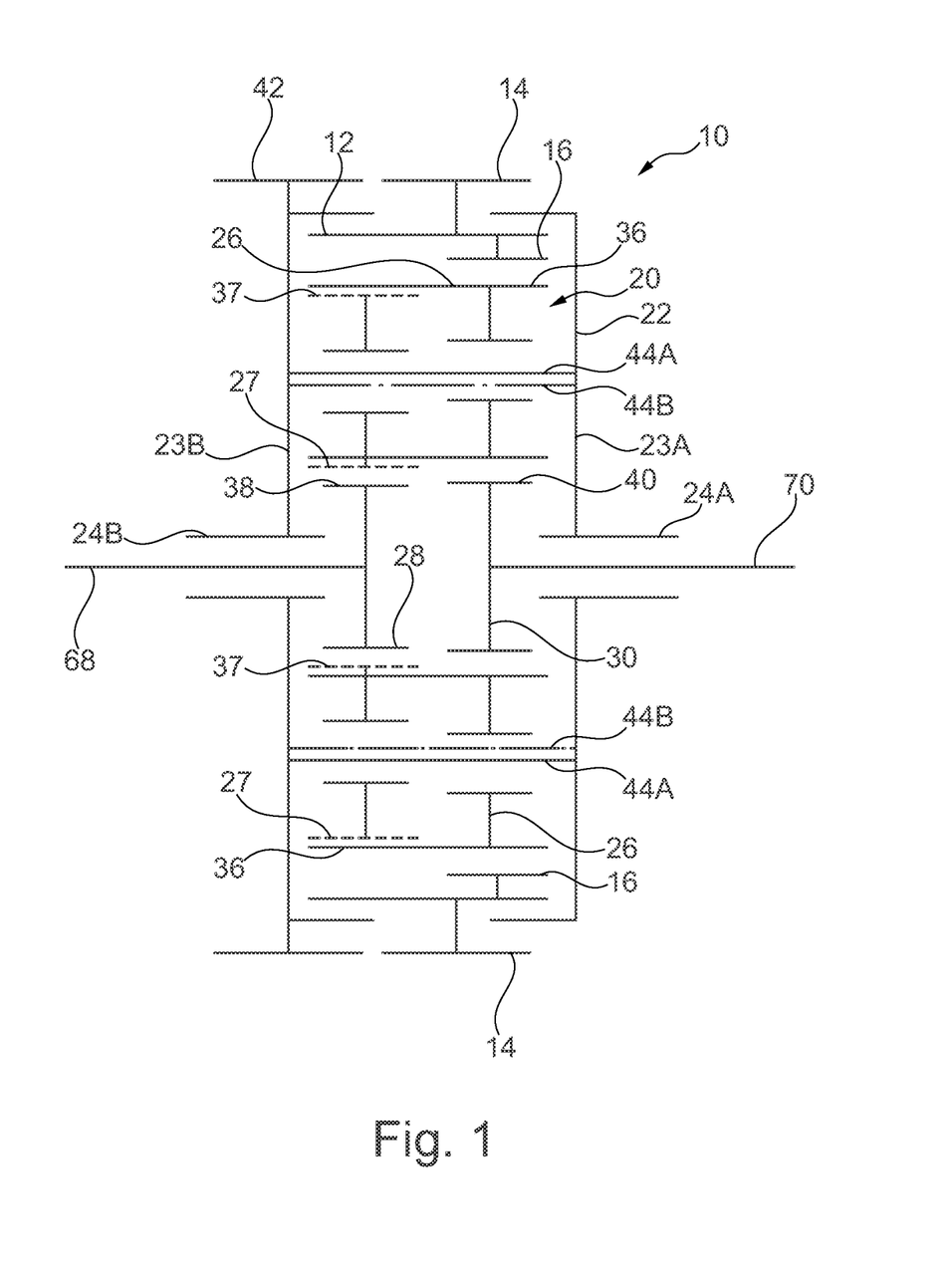
FIG. 1 is a schematic view, in cross section, of a first embodiment of a CVT differential.

Referring now to FIG. 1, first embodiment of a continuously variable transmission (CVT) differential 10 is schematically illustrated. The CVT differential 10 includes a first drive input ring gear 12 having external teeth 14 and internal teeth 16. These are shown in detail FIGS. 2 and 3. The first drive input ring gear 12 is mounted for rotation via bearings, which are not illustrated in further detail.

Figure 2:
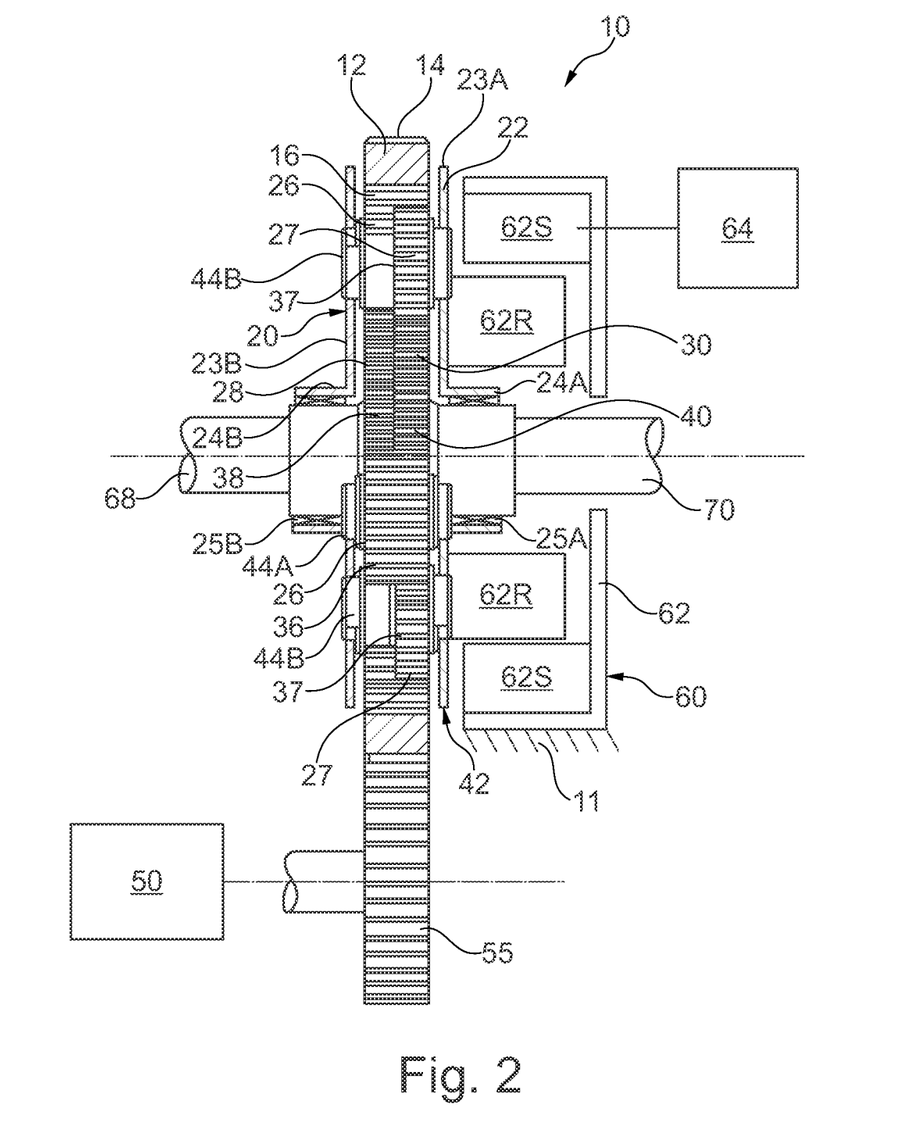
FIG. 2 is a cross-sectional view through a portion of the CVT differential shown in FIG. 1 illustrating the first drive input ring gear driven by an input gear connected to a primary drive as well as the planetary spur gears connected to a carrier and engaging sun gears that drive two output shafts, as well as a second drive input connected to the planet carrier.
Figure 3:
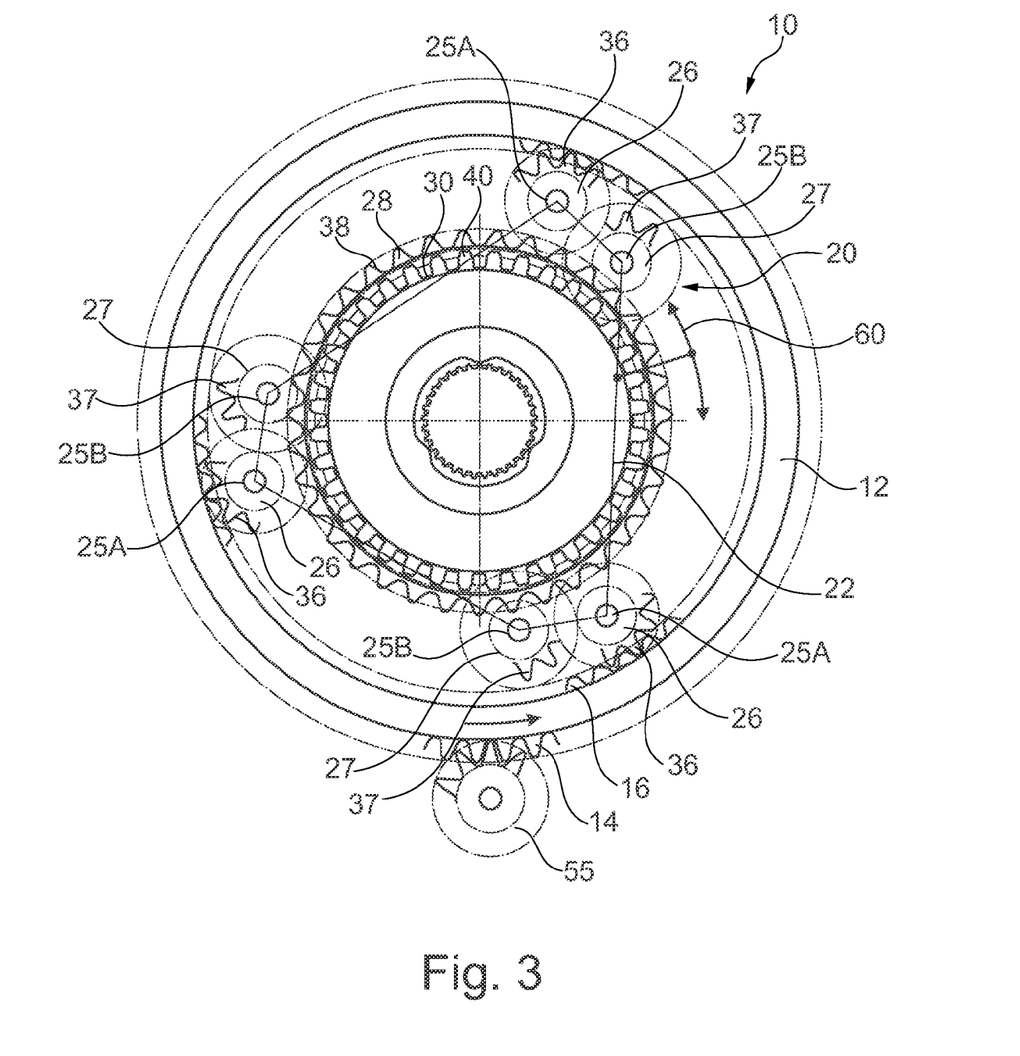
FIG. 3 is an end view, partially in schematic form, showing the arrangement of the CVT differential in FIG. 2.

A planetary differential 20 is connected to the first drive input ring gear 12. The planet differential 20 includes a planet gear carrier 22, first planet gears 26, second planet gears 27, a first sun gear 28, and a second sun gear 30. The carrier 22 is shown in this embodiment as being formed by carrier plates 23a, 23b, that have flanges 24a, 24b, preferably supported via bearings 25a, 25b, as shown in FIG. 2 and FIG. 3. Planet pins 44a, 44b are used to mount the first planet gears 26 and second planet gears 27 to the carrier 22, as shown in detail in FIG. 2 and represented schematically in FIG. 1, the first planet gears 26 include teeth 36 that are engaged by the internal teeth 16 of the first drive input ring gear 12 and also engage teeth 38, of the first sun gear 28. The teeth 36 of each of the first planet gears 26 also engage teeth 37 of corresponding ones of the second planet gears 27 due to the axial overlap of the first planet gears 26 with the second planet gears 27 as shown in detail in FIG. 2. The teeth 37 and the second planet gears 27 engage teeth 40 and the second sun gear 30. This is also shown in detail in FIGS. 2 and 3. As shown in detail in FIG. 3, the teeth 36 of the first planet gear 26 have a crown circle which does not overlap the crown circle of the teeth 40 of the second sun gear 30.

Figure 5:
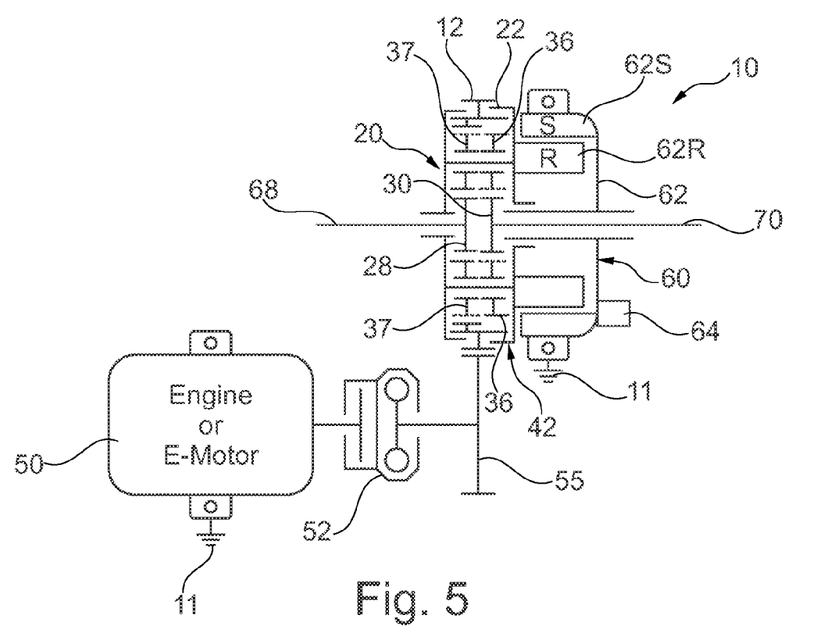
FIG. 5 is a schematic view of a CVT differential as shown in FIG. 1 connected to a primary drive and a secondary drive.

As shown in FIGS. 2 and 5, preferably a primary drive 50 is connected to the first drive input ring gear 12 via a drive gear 55 engaging the external teeth 14 of the first drive input ring gear 12. The primary drive 50 is preferably an internal combustion engine, but can also be an electric motor. As discussed in detail below, a torque converter 52 (see FIG. 5) can be located between the drive 50 and the first drive input ring gear 12.

Referring to FIGS. 2 and 5, a second drive input 42 is connected to the planet gear carrier 22 thereby allowing the planet gear carrier to be both an input from a power source as well as an integral part of the planetary set. Preferably, a secondary drive 60 is connected to the second drive input 42. In this embodiment, the secondary drive 60 comprises a second electric motor 62 preferably having a rotor 62R that is fixed to the carrier 22 for the first and second sets of planet gears 26, 27. The second electric motor 62 further includes a stator 62S which is mounted to the chassis or frame, represented as 11. In this embodiment, the second electric motor 62 is concentric to the output shafts or axles 68, 70 which are connected to the sun gears 28, 30, respectively.

Preferably a motor controller 64 is also provided in order to control an output ratio of the CVT differential 10 in order to vary at least one of a speed or a direction of rotation of the first and second sun gears 28, 30. The second electric motor 62 is preferably a reversible, brushless DC motor and by varying the speed of the second electric motor 62, higher or lower output ratios for the output shaft 68, 70 can be achieved. By reversing a direction of the second electric motor 62, a direction of rotation of the output shafts or axles 68, 70 can be reversed, providing a reverse gear.

Preferably, the second electric motor is a motor-generator and a Hall-effect sensor is provided in the second electric motor 62 or in the controller 64 in order to sense a current flow and switch between a drive mode and a generator mode, depending upon inputs from the controller 64 which can receive signals from the ECM or other on board computer for a motor vehicle that provides various operating parameters as inputs for drive or regeneration to the second electric motor 62.

As shown in FIG. 5, the CVT differential 10 in accordance with the first embodiment is connected to a primary drive 50 which can be an internal combustion engine or an electric motor and is fixed to a chassis or frame 11 of the motor vehicle. Here the torque converter 52 is shown between the primary drive 50 and the input gear 55.

Figure 4:
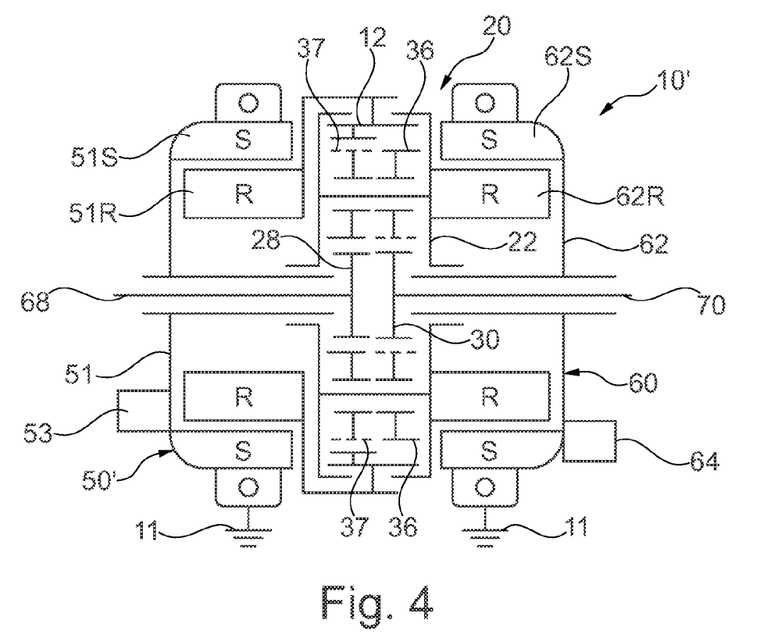
FIG. 4 is a schematic view of a second embodiment of a CVT differential in which the primary drive and secondary drive are both electric motors.

Referring now to FIG. 4, a second embodiment of a CVT differential 10' is shown. The CVT differential 10' is similar to the CVT differential 10 with respect to the second electric motor 62 as the secondary drive 60. However, the arrangement shown is for a full electric motor vehicle in which the primary drive 50' is also an electric motor 51. This primary or first electric motor 51 includes a rotor 51R that is fixed to the first drive input ring gear 12. The stator 51S of the first electric motor 51 is connected to the chassis or frame 11 of the vehicle. A controller 53 is provided for the first electric motor 51. With respect to the differential arrangement, a spur gear differential 20 is provided as discussed above. In this case, both the primary drive in the form of the first electric motor 51 and the secondary drive in the form of the second electric motor 62 are used to drive the CVT differential 10'. By varying the speed of either the first or the second electric motors 51, 62, higher or lower output ratios for the output shaft 68, 70 can be achieved. By reversing a direction of the first or second electric motor 51, 62, a direction of rotation of the output shafts or axles 68, 70 can be reversed, providing a reverse gear.

Figure 6:
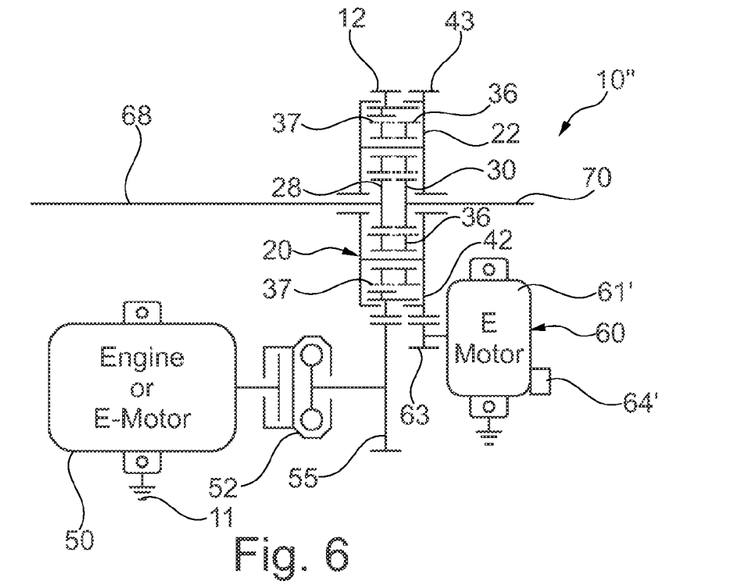
FIG. 6 is a schematic view of a third embodiment of a CVT differential.

Referring now to FIG. 6, a third embodiment of a CVT differential 10" is shown. The CVT differential 10" utilizes the spur gear differential 20. As in the first embodiment, and the primary drive is the internal combustion engine or motor 50 connected to the frame or chassis. This is connected via a torque converter 52 with the input gear 55. In this case, the secondary drive input 42 is in the form of a ring gear 43 connected to the carrier 22. The secondary drive 60 in the form of the electric motor 61' drives a second input gear 63 that engages with the ring gear 43 connected to the carrier 22. The controller 64' is shown connected to the electric motor 61'. Functionally, this provides the same operation as the first two embodiments with the ability to change the location of the electric motor 61' rather than having this arranged concentrically with the output shaft 68, 70.

Figure 7:
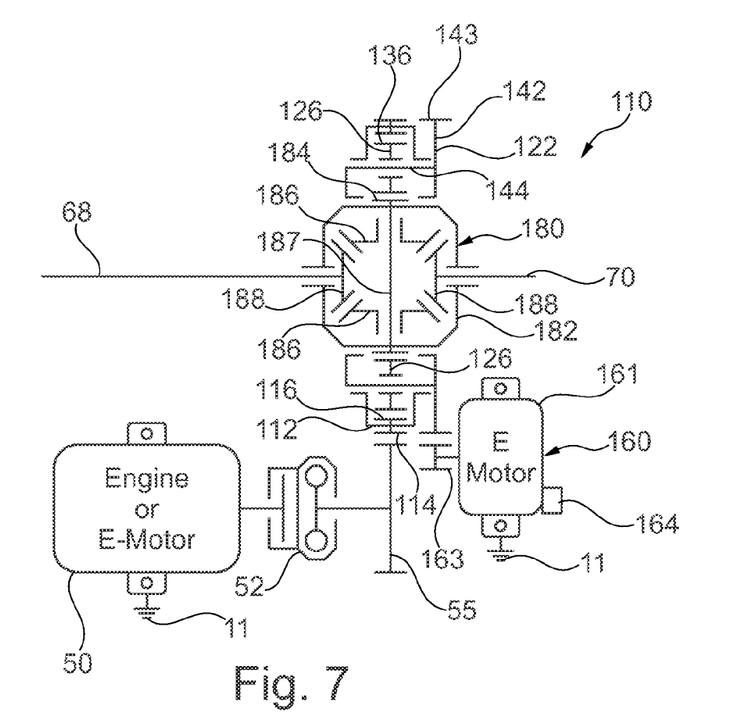
FIG. 7 is a schematic view of a fourth embodiment of a CVT differential.

Referring now to FIG. 7, a CVT differential 110 is shown. The CVT differential 110 includes a first drive input ring gear 112 having internal teeth 116 as well as external teeth 114. A carrier 122 with planet gears 126 is located within the first drive input ring gear 112. Teeth 136 of the planet gears 126 engage the internal teeth 116 of the first drive input ring gear 112. The planet gears 126 are preferably mounted via pins 144.

In this embodiment, a bevel gear differential 180 including a bevel gear carrier 182 having external teeth 184 is utilized instead of the spur gear differential. The teeth 136 of the planet gears 126 engage the external teeth 184 of the bevel gear carrier 182. A second drive input 142 is connected to the carrier 122. In the embodiment shown in FIG. 7, a primary drive 50 which can be an engine or an electric motor as discussed above is provided and is connected to the chassis or frame 11 of the motor vehicle. Preferably, a torque converter 52 is connected to the primary drive 50 and drives an input gear 55 that engages the external teeth 114 of the first drive input ring gear 112. A secondary drive 160 in the form of a second electric motor 161 is preferably connected to the second drive input 142. In this case, the second drive input 142 includes a ring gear 143 and the second electric motor 161 includes a second drive gear 163 that engages with the ring gear 143. Functionally, the CVT differential 110 is identical to the CVT differential 10" discussed above with the secondary drive in the form of the second electric motor 161 providing for a wide gear ratio without disengaging the primary drive as well as reverse by changing the direction of the second electric motor 161. The second electric motor 161 is preferably a reversible, brushless electric motor with electronic speed control.

Figure 8:
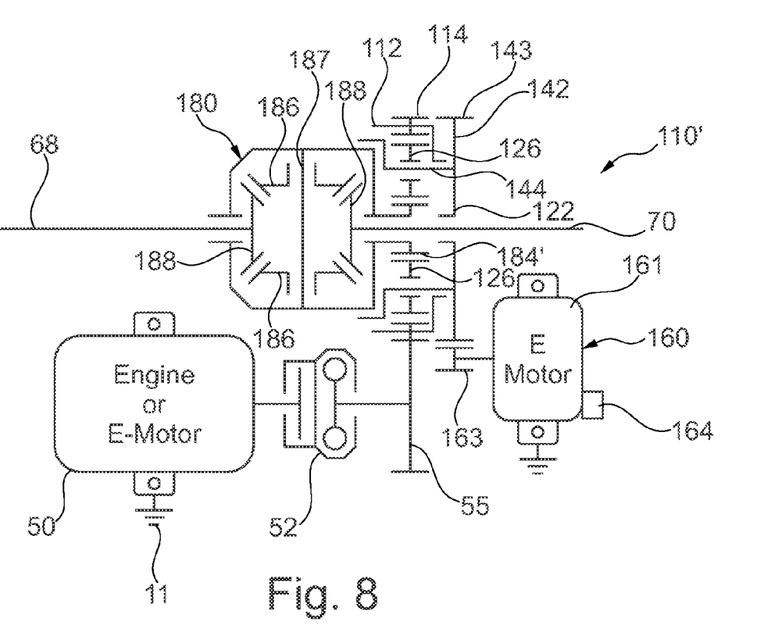
FIG. 8 is a schematic view of a fifth embodiment of a CVT differential.

Referring now to FIG. 8, a fifth embodiment of a CVT differential 110' is shown. The CVT differential 110' is functionally equivalent to the CVT differential 110 which uses the bevel gear differential 180 and like elements have been identified with like numbers. In this case, the bevel gear differential 180 is offset axially in a direction of the output shafts or axles 68, 70 from the primary drive input with the input gear 55 driving the carrier 122 that is arranged axially offset from the bevel gear differential 180. In this case, the bevel gear carrier 182 of the differential 180 includes external teeth 184' that are offset on one side of the bevel gear carrier 182. These are engaged by the planet gears 126 which can be arranged in a reduced pitch circle in comparison with the embodiment of FIG. 7. This arrangement exhibits a more compact radial configuration of the components with the same functionality as discussed above.

Figure 9:
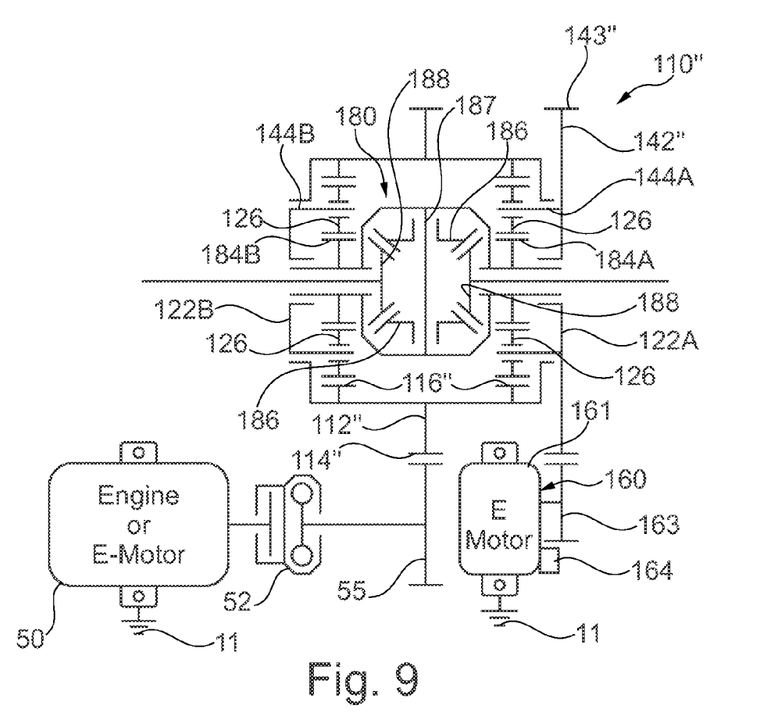
FIG. 9 is a schematic view of a sixth embodiment of a CVT differential.

Referring now to FIG. 9, a sixth embodiment of a CVT differential 110" is shown. This arrangement is functionally equivalent to the fifth embodiment 110' except that the bevel gear differential 180 is nested within a double sided planetary CVT. In this case, the primary drive via the engine or motor 50 drives a first drive input ring gear 112" that includes external teeth 114" as well as internal teeth 116" which can be provided as two separate sets of ring gears 116" with one located on each side of the bevel gear differential 180. In this case, the second drive input 142" is provided as an external ring gear 143" on the carrier 122a. A second carrier 122B is provided for the planet gears 126 on the opposite side of the bevel gear differential 180. As shown, the planet gears 126 are rotatably mounted via pins 144A, 144B connected to the respective carriers 122A, 122B. While functionally identical to the previous embodiment, this arrangement provides for higher torque transmitting capabilities.

In each of the above embodiments, all the rotating parts would be supported via appropriate bearings or bushings and the arrangements would be encased in an outer casing to allow for lubrication. As these items are customary in the art, they have not been described in further detail.

Having thus described the present invention in detail, it is to be appreciated and will be apparent to those skilled in the art that many physical changes, only a few of which are exemplified in the detailed description of the invention, could be made without altering the inventive concepts and principles embodied therein. It is also to be appreciated that numerous embodiments incorporating only part of the preferred embodiment are possible which do not alter, with respect to those parts, the inventive concepts and principles embodied therein. The present embodiment and optional configurations are therefore to be considered in all respects as exemplary and/or illustrative and not restrictive, the scope of the invention being indicated by the appended claims rather than by the foregoing description, and all alternate embodiments and changes to this embodiment which come within the meaning and range of equivalency of said claims are therefore to be embraced therein.

The invention claimed is:

1. A continuously variable transmission differential, comprising:
   a first drive input ring gear having internal teeth;
   a planetary differential connected to the first drive input ring gear, the planetary differential including a planet gear carrier, first planet gears, second planet gears, a first sun gear, and a second sun gear, teeth of the first planet gears are engaged by the internal teeth of the first drive input ring gear and engage teeth of the first sun gear, and the teeth of each of the first planet gears also engage teeth of corresponding ones of the second planet gears, and the teeth of the second planet gears engage teeth of the second sun gear; and
   a second drive input connected to the planet gear carrier.

2. The continuously variable transmission differential as claimed in claim 1, further comprising a primary drive connected to the first drive input ring gear.

3. The continuously variable transmission differential as claimed in claim 2, wherein primary drive is an internal combustion engine or an electric motor.

4. The continuously variable transmission differential as claimed in claim 2, further comprising a torque converter located between the primary drive and the first drive input ring gear.

5. The continuously variable transmission differential as claimed in claim 1, further comprising a secondary drive connected to the second drive input.

6. The continuously variable transmission differential as claimed in claim 5, wherein the secondary drive comprises a second electric motor.

7. The continuously variable transmission differential as claimed in claim 6, wherein the second electric motor is a motor-generator.

8. The continuously variable transmission differential as claimed in claim 6, wherein the second electric motor is connected to a controller in order to control an output ratio of the continuously variable transmission differential in order to vary at least one of a speed and a direction of rotation of the first and second sun gears.

9. The continuously variable transmission differential as claimed in claim 6, wherein the second electric motor includes a rotor connected to the planet carrier and a stator that is mounted fixed relative to the rotor.

10. The continuously variable transmission differential as claimed in claim 6, wherein the second electric motor includes a drive gear that engages a gear on the planet carrier.

11. The continuously variable transmission differential as claimed in claim 1, wherein first and second output shafts are connected to the first and second sun gears, respectively.

12. The continuously variable transmission differential as claimed in claim 11, wherein the second drive input comprise a second electric motor that is arranged concentrically around one of the output shafts.

* * * * *